United States Patent [19]

Ikemoto et al.

[11] Patent Number: 5,030,101
[45] Date of Patent: Jul. 9, 1991

[54] VOICE OUTPUT DEVICE FOR USE IN ELECTRONIC APPLIANCE

[75] Inventors: Yutaka Ikemoto; Ken Sawada, both of Nara, Japan

[73] Assignee: Sharp Kabushiki Kaisha, Osaka, Japan

[21] Appl. No.: 873,279

[22] Filed: Jun. 9, 1986

Related U.S. Application Data

[63] Continuation of Ser. No. 561,792, Dec. 15, 1983, abandoned.

[30] Foreign Application Priority Data

Dec. 23, 1982 [JP] Japan ............................. 57-232222

[51] Int. Cl.$^5$ .................... G09B 5/04; G09B 19/06
[52] U.S. Cl. ............................ 434/157; 434/321; 434/335
[58] Field of Search ............... 434/157, 321, 327, 335

[56] References Cited

U.S. PATENT DOCUMENTS

| | | | |
|---|---|---|---|
| 4,189,779 | 2/1980 | Brautingham | 434/335 |
| 4,218,760 | 8/1980 | Levy | 434/157 |
| 4,403,965 | 9/1983 | Hawkins | 434/327 |
| 4,417,319 | 12/1983 | Morimoto et al. | 434/157 |
| 4,438,505 | 3/1984 | Yanagiuchi et al. | 434/157 |
| 4,457,719 | 7/1984 | Dittakaui et al. | 434/335 |
| 4,644,492 | 2/1987 | Murata | 434/157 |

*Primary Examiner*—Edward M. Coven
*Assistant Examiner*—Jessica J. Harrison

[57] ABSTRACT

A voice output device for use in an electronic appliance, including a first member for detecting generation of data concerning starting or completion of operation of the electronic appliance, a memory for storing messages to be verbally transmitted to an operator of the appliance, a second member for selecting, in response to an output signal from the first member, one of the messages, and a third member for verbally transmitting the one of the messages to the operator.

5 Claims, 4 Drawing Sheets

Fig. 5
|    | Sentence |
|----|----------|
| S1 | Hello!   |
| S2 | Are you fine? |
| S3 | Let's study together. |
Fig. 6
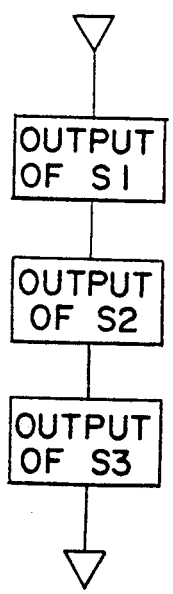
Message (a)
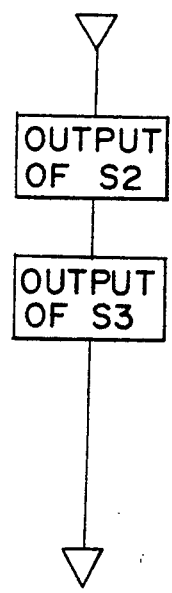
Message (b)
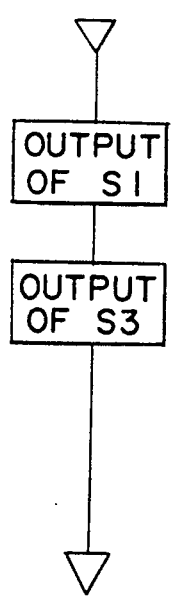
Message (c)

VOICE OUTPUT DEVICE FOR USE IN ELECTRONIC APPLIANCE

This application is a continuation of application Ser. No. 561,792 filed on Dec. 15, 1983 and now abandoned.

BACKGROUND OF THE INVENTION

The present invention generally relates to electronic appliances and more particularly, to a voice output device for use in an electronic appliance such as an electronic translator for translating words, etc. between different languages, a language teaching machine and the like, which is arranged to transmit a verbal message to an operator of the electronic appliance through detection of starting or completion of operation of the electronic appliance.

Conventionally, there have been proposed electronic translators provided with voice output devices. However, in the known voice output devices, it has been so arranged that only translated words are verbally conveyed to the operator but messages corresponding to operational states of the translators themselves are not verbally conveyed to the operator. Thus, the prior art voice output devices have such an inconvenience that a functional state of the translators, for example, a voltage level of cells thereof is required to be checked while an operation for voice output of any word is being performed.

SUMMARY OF THE INVENTION

Accordingly, an essential object of the present invention is to provide an improved voice output device for use in an electronic appliance, which is arranged to transmit a verbal message to an operator of the electronic appliance through detection of starting or completion of operation of the electronic appliance so as to remarkably enhance familiarity of the operator with the electronic appliance and operational efficiency of the electronic appliance through elimination of operational errors of the operator, with substantial elimination of the disadvantages inherent in conventional voice output devices of this kind.

Another important object of the present invention is to provide an improved voice output device of the above described type which is simple in structure, highly reliable in actual use, suitable for mass production at low cost and can be readily incorporated into electronic appliances and the like at low cost.

In accomplishing these and other objects according to one preferred embodiment of the present invention, there is provided an improved voice output device for use in an electronic appliance, comprising: a first means for detecting generation of data concerning starting or completion of operation of the electronic appliance; a memory means for storing messages to be verbally transmitted to an operator of the electronic appliance; a second means for selecting, in response to an output signal from the first means, one of the messages; and a third means for verbally transmitting said one of said messages to the operator.

In accordance with the present invention, since it is so arranged that verbal messages are transmitted to the operator through detection of starting or completion of operation of the electronic appliance and a plurality of the messages are beforehand stored in a memory such that one of the messages is verbally transmitted to the operator selectively in accordance with an internal state of the electronic appliance at the time of voice output of the one of the messages, familiarity of the operator with the electronic appliance is remarkably enhanced and further, it becomes possible to check whether or not the electronic appliance functions normally. For example, in the case where a sufficient sound volume cannot be obtained in the electronic appliance due to a drop in a voltage level of cells therein, it becomes possible to be aware of such a state beforehand and thus, volume control of the electronic appliance can be performed in advance with much ease.

Furthermore, in accordance with the present invention, it becomes possible to inform the operator that normal operation of the electronic appliance has been completed through voice output at the time of completion of operation of the electronic appliance. For example, since the operator wearing a head phone finishes operation of the electronic appliance while inserting the electronic appliance body into one of the pockets of his clothes, he can check functional states of the electronic appliance even in the case where he performs switching operations of the electronic appliance without taking the electronic appliance body out of the pocket. Consequently, such an undesirable phenomenon does not take place that the operator erroneously fails to turn off the power source of the electronic appliance after completion of operation thereof.

BRIEF DESCRIPTION OF THE DRAWINGS

These and other objects and features of the present invention will become apparent from the following description taken in conjunction with the preferred embodiment thereof with reference to the accompanying drawings, in which:

FIG. 5 is a table explanatory of sentences stored as voice data in the system of FIG. 2; and FIG. 6 is a view explanatory of various voice outputs composed of combinations of the sentences of FIG. 5.

Before the description of the present invention proceeds, it is to be noted that like parts are designated by like reference numerals throughout several views of the accompanying drawings

DETAILED DESCRIPTION OF THE INVENTION

Figure 1:
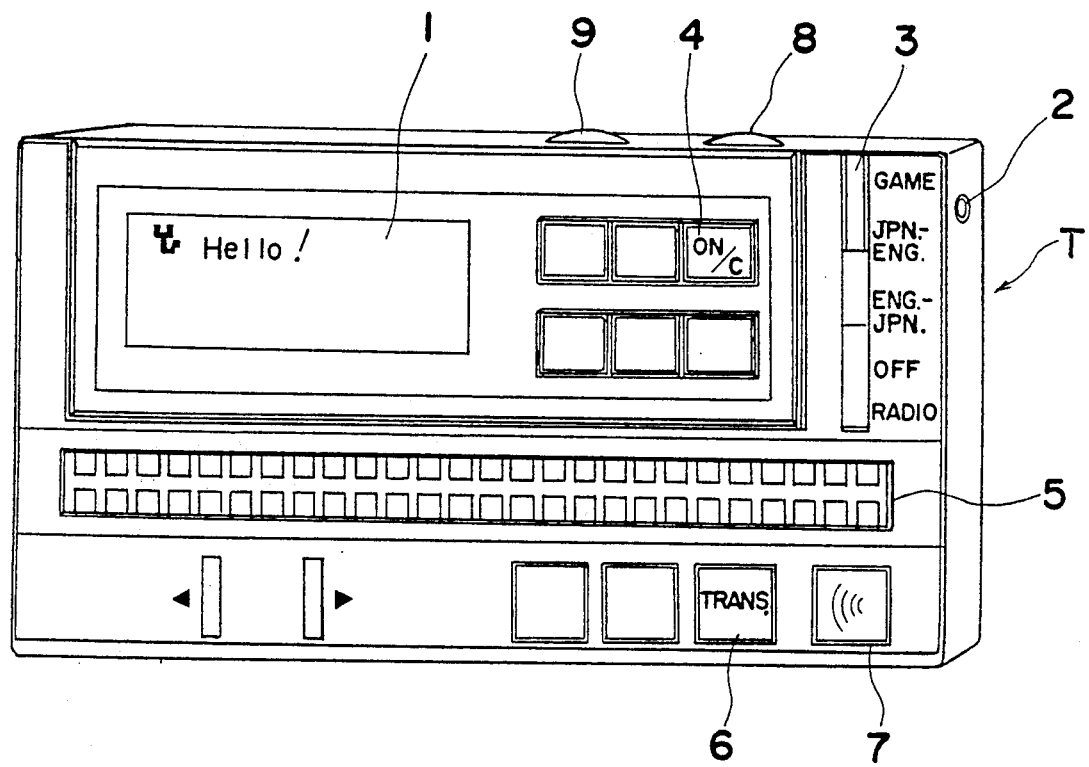
FIG. 1 is an electronic translator equipped with a radio set, in which a voice output device according to the present invention is incorporated.

Referring now to FIG. 1, there is shown an electronic translator T equipped with a radio set, in which a voice output device according to the present invention is incorporated. The translator T includes a display unit 1 constituted by, for example, liquid crystal dot matrices, a head phone jack 2 for receiving radio broadcast, a mode changeover switch 3 for effecting changeover among modes "radio", "power off", "Eng.-Jpn. trans.", "Jpn.-Eng. trans." and "game", an ON/CLEAR key 4, input keys 5 for inputting characters, symbols, etc. such as alphabets, numerals and the like, a voice output key 7, a volume control dial 8 and a tuning dial 9 for the radio set. It is to be noted that the above described terms "Eng.-Jpn. trans." and "Jpn.-Eng. trans." are abbreviations of the terms "English-Japanese translation" and "Japanese-English translation", respectively, and the display unit 1 is provided with upper and lower display portions.

Hereinbelow, operations of the translator T will be briefly described.

Firstly, by changing over the mode changeover switch 3, one of the modes "radio", "power off", "Eng.-Jpn. trans.", "Jpn.-Eng. trans." and "game" can be selected. In the case where the mode changeover switch 3 is changed over from the mode "power off" to the mode "Eng.-Jpn. trans." or the mode "Jpn.-Eng. trans.", a voice output is yielded as will be described below, while an English message, for example, "Hello!" is displayed on the display unit 1 together with a character symbolically illustrating, e.g., a cat. Furthermore, one of the following three English messages (a), (b) and (c) can be verbally transmitted to an operator of the translator T in accordance with an internal state of the translator T.

(a) Hello! Are you fine? Let's study together.
(b) Are you fine? Let's study together.
(c) Hello! Let's study together.

Figure 2:
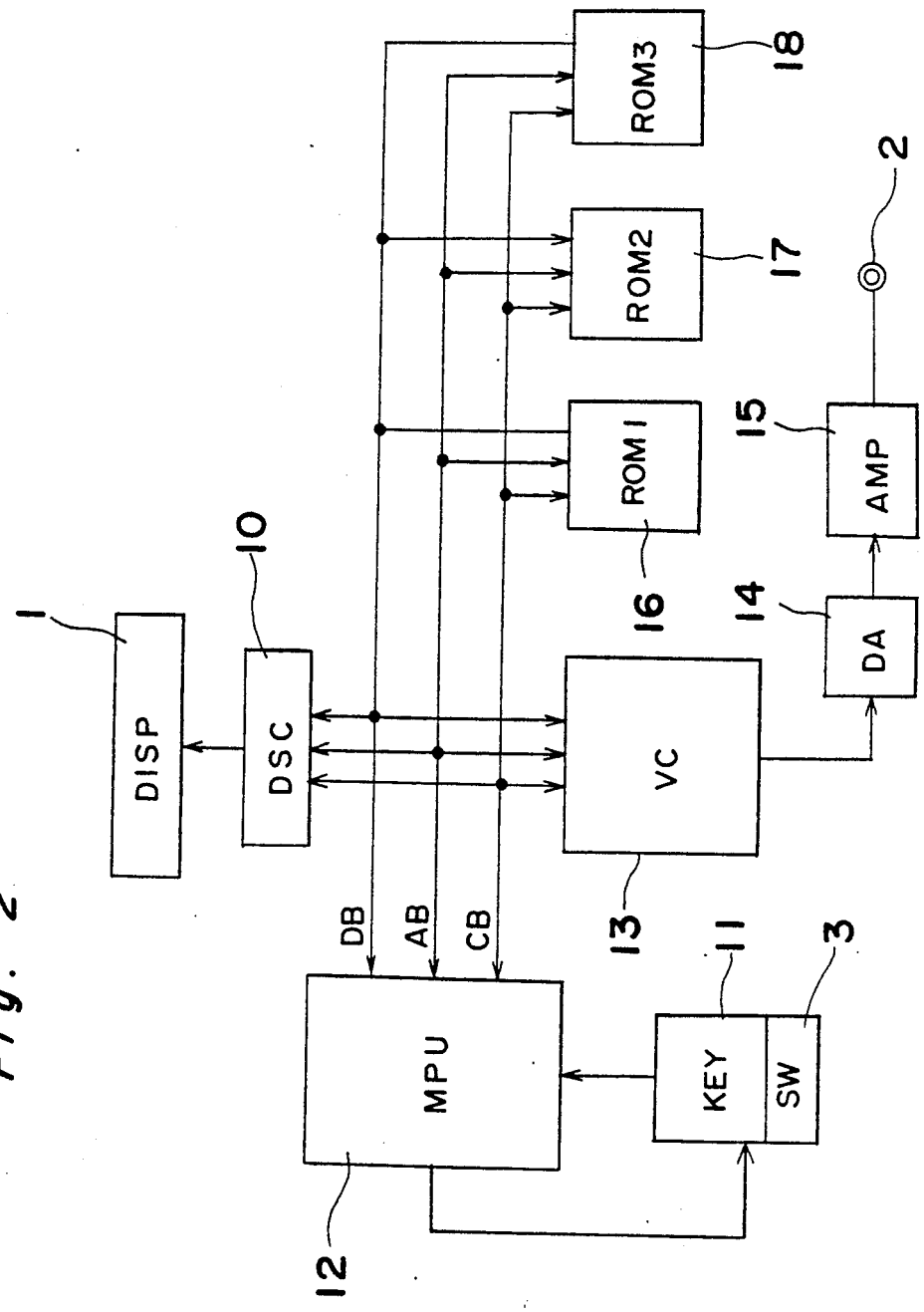
FIG. 2 is a block diagram showing a system of the translator of FIG. 1.

Referring to FIG. 2, there is shown a system of the translator T, in which the display of the characters or the symbols on the display unit 1 is controlled by a display drive controller 10. The system further includes a key input unit 11, a microprocessor 12, a speech synthesis controller 13 for synthesizing speeches corresponding to sentence numbers or word numbers transmitted from the microprocessor 12, a digital/analog converter 14, a voice signal amplifier 15, a read-only memory 16 for storing a control program of the microprocessor 12, a read-only memory 17 for storing data on spellings of sentences or words and a read-only memory 18 for storing voice data to be used for speech synthesis. In the system of FIG. 2, it is so arranged that the microprocessor 12 transmits a strobe signal to the key input unit 11 and the mode changeover switch 3 so as to detect an input state of the translator T through reading of a return signal for the strobe signal. Meanwhile, each of the read-only memories 16, 17 and 18 is connected to the microprocessor 12 through a data bus DB, an address bus AB and a control bus CB. The display drive controller 10 is constituted by a random access memory (RAM) having a display area corresponding partially to each dot of the display unit 1. When desired bit patterns are written in the display area, desired characters or symbols are displayed on the display unit 1.

Figure 3:
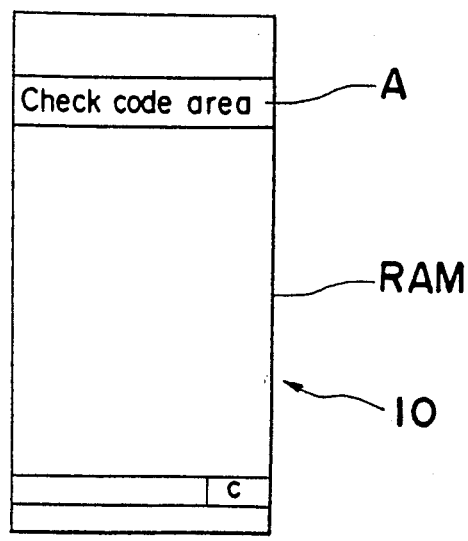
FIG. 3 is a view explanatory of a main portion of a random access memory of a display drive controller employed in the system of FIG. 2.

Referring to FIG. 3, there is shown a main portion of the RAM in the display drive controller 10. The RAM includes a counter C and a check code area A. The counter C, which is for determining sentences to be verbally outputted at the time of turning on of the power source, is composed of two bits. Meanwhile, the check code area A stores a check code for identifying whether execution of a program is started by replacement of the cells or any other cause such as operation of the mode changeover switch 3, etc. as will be described in detail later.

Figure 4:
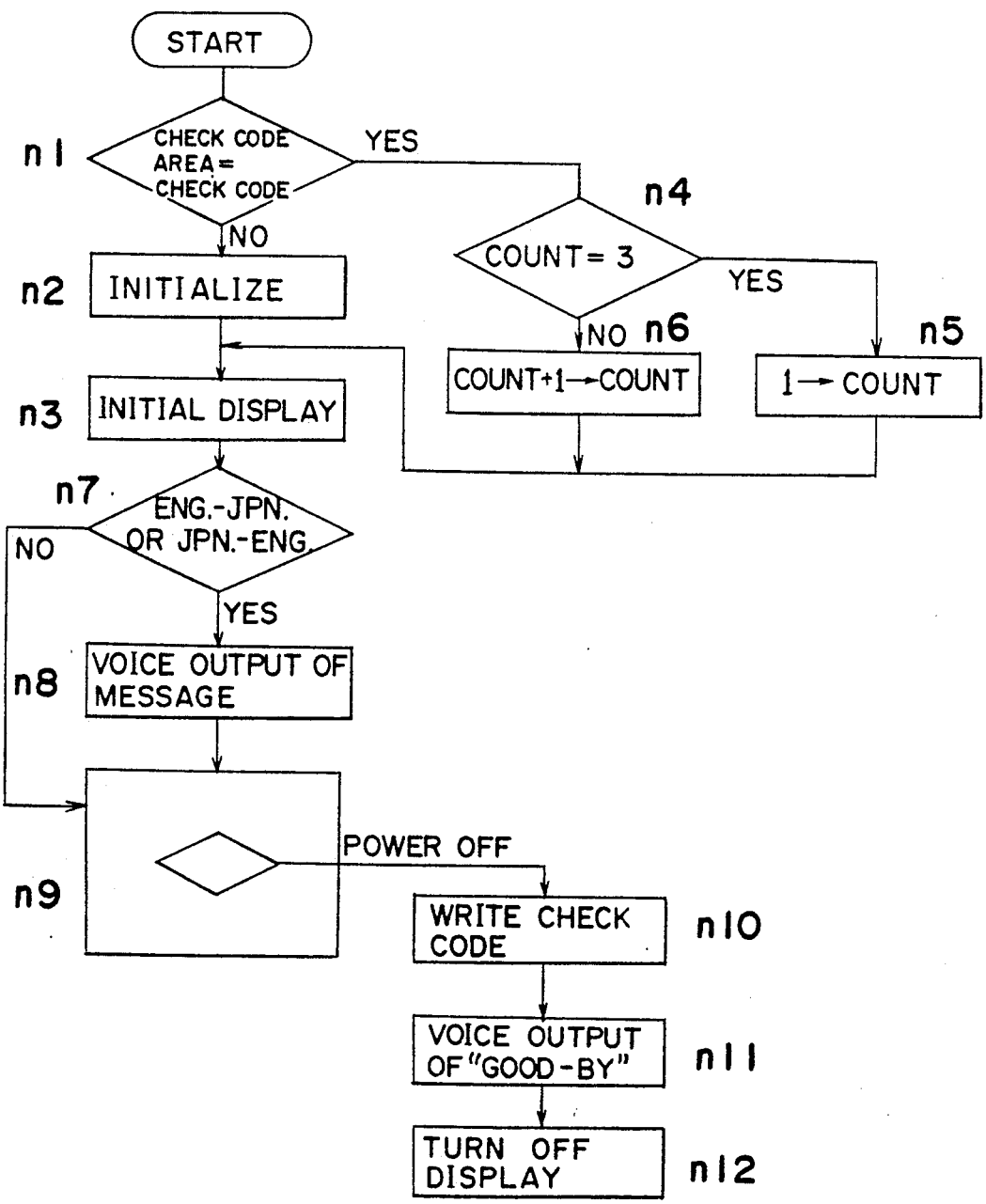
FIG. 4 is a flow chart showing an operational sequence of the translator of FIG. 1.

Hereinbelow, an operational sequence of the translator T will be described in accordance with a flow chart in FIG. 4.

In the case where the cells of the translator T have been replaced by new ones or the mode changeover switch 3 has been changed over from the mode "power off" to the mode "Eng.-Jpn. trans.", the mode "Jpn-Eng trans." or the mode "game", the microprocessor 12 starts processing from the first address of the program In the first place, at a step n1, the contents of the check code area A are read and then, a decision is made as to whether or not the contents of the check code area A are equal to predetermined check codes. In the case of "NO" at step n1, the contents of the memory are not backed up, so that each of the contents is initialized at a step n2 and then, initial display is performed at a step n3. On the other hand, in the case of "YES" at step n1, the contents of the memory are backed up, so that the counter C starts a counting operation on the assumption that processing of the program has been started through changeover of the mode changeover switch 3. Subsequently, at the time when the counter C has counted up to three at a step n4, the count content is reset to one at a step n5 and then, step n3 follows.

Display drive control of the display unit 1 is performed by writing desired patterns in the memory corresponding to each dot of the display matrixes of the display unit 1 as described above. Thereafter, a changeover position of the mode changeover switch 3 is detected. If it is found at a step n7 that the mode changeover switch 3 has been changed over to the mode "Eng.-Jpn. trans." or "Jpn.-Eng. trans.", sentences corresponding to a value of the counter C are verbally outputted at a step n8.

When the mode changeover switch 3 is changed over to the mode "power off" at a step n9 after the translator T has been used for a translating purpose, the above described predetermined check codes are written in the check code area A at a step n10. Subsequently, an English message "Good-bye" is verbally outputted at a step n11 and then, a command "power off" is executed so as to turn off the display of the display unit 1 at a step n12.

Referring now to FIG. 5, there are shown three English sentences stored as voice data in the memory 18. The three English sentences include a first English sentence S1 "Hello!", a second English sentence S2 "Are you fine?" and a third English sentence S3 "Let's study together."

As shown in FIG. 6, the three English messages (a), (b) and (c) as referred to earlier are, respectively, composed of the first, second and third English sentences S1, S2 and S3, the second and third English sentences S2 and S3 and the first and third English sentences S1 and S3, and are selectively verbally outputted in accordance with the value of the counter C.

It should be noted here that the voice output device of the present invention is incorporated in the electronic translator equipped with the radio set in this embodiment but can also be applied to other various electronic appliances such as a voice output type teaching machine, etc.

As is clear from the foregoing description, in accordance with the present invention, since the verbal messages are transmitted to the operator at the time of starting or completion of operation of the appliance, familiarity of the operator with the appliance is remarkably enhanced and it becomes possible to confirm that the appliance functions normally.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. A voice output device for use in an electronic language translator, comprising:

mode changeover switch means for manually placing said electronic language translator in one of a plurality of operational modes;

first means for detecting the operational mode selected upon power-up or power-off of said language translator by said changeover switch means;

memory means for storing messages related to each of said operational modes, each of said massages to be verbally transmitted to an operator of said electronic language transistor according to the manual position of said mode changeover switch;

second means for accessing, in response to an output signal from said first means, one of said messages from said memory means for indicating said selected operational mode, upon said power-up or power-off of said language translator, said second means including a random access memory; and third means, responsive to said second means, for verbally transmitting one of said selected messages to the operator whereby the operator is audibly alerted to the operational mode being selected by the operational mode switch at the start-up or completion of operation of the electronic language translator;

wherein said random access memory includes a check code area and a counter, said counter determining sentences to be verbally outputted from said language translator in response to actuation of said mode changeover switch means, and said check code area storing a check code for identifying the operation of said operational mode selected.

2. A voice output device as claimed in claim 1, wherein said first means includes a microprocessor.

3. The voice output device according to claim 1, wherein said plurality of operational modes include an "ON" mode, an "OFF" mode, a game mode, an English to Japanese translation mode, and a Japanese to English translation mode.

4. A voice output device for use in an electronic appliance, comprising:

mode changeover switch means for manually placing said electronic appliance in a selected one of a plurality of operational modes;

first means for detecting the operational mode selected upon power-up or power-off of said appliance by said changeover switch means;

memory means for storing messages to be verbally transmitted to an operator of said electronic apparatus according to the manual position of said mode changeover switch;

second means for accessing, in response to an output signal from said first means, one of said messages from said memory means for indicating said selected operational mode, upon said power-up or power-off of said appliance, said second means including a random access memory; and third means, responsive to said second means, for verbally transmitting one of said selected messages to the operator whereby the operator is audibly alerted to the operational mode being selected by the operational mode switch at the start-up or completion of operation of the electronic appliance;

wherein said random access memory includes a check code area and a counter, said counter determining sentences to be verbally outputted from said electronic appliance in response to actuation of said mode changeover switch means, and said check code area storing a check code for identifying the operation of said operational mode selected.

5. The voice output device according to claim 4, wherein said plurality of operational modes include an "ON" mode, an "OFF" mode, a game mode, an English to Japanese translation mode, and a Japanese to English translation mode.

* * * * *